United States Patent [19]

Cacarda

[11] Patent Number: 4,476,856
[45] Date of Patent: Oct. 16, 1984

[54] PROCESS FOR THE PRODUCTION OF A SOLAR COLLECTOR PANEL ASSEMBLY AND A PANEL ASSEMBLY PRODUCED THEREBY

[75] Inventor: Jaroslav Cacarda, Strullendorf, Fed. Rep. of Germany

[73] Assignee: E. Cacarda GmbH, Strullendorf, Fed. Rep. of Germany

[21] Appl. No.: 566,568

[22] Filed: Dec. 29, 1983

[30] Foreign Application Priority Data

Jan. 21, 1983 [DE] Fed. Rep. of Germany ....... 3301858

[51] Int. Cl.$^3$ ............................................... F24J 3/02
[52] U.S. Cl. ..................................... 126/447; 126/448; 165/170
[58] Field of Search ............... 126/417, 442, 444, 445, 126/447, 448, 449, 450; 29/157.3 C, 157.3 V; 165/170, 171

[56] References Cited

U.S. PATENT DOCUMENTS

| | | | |
|---|---|---|---|
| 1,994,903 | 3/1935 | Warrender | 29/157.3 V |
| 3,987,784 | 10/1976 | Godrick | 126/447 |
| 4,074,406 | 2/1978 | Boyd | 29/157.3 C |
| 4,084,574 | 4/1978 | Golay | 126/447 |
| 4,089,326 | 5/1978 | Andrassy | 126/447 |
| 4,094,301 | 6/1978 | Sorenson | 165/171 |
| 4,109,711 | 8/1978 | Kleine | 126/444 |
| 4,165,733 | 8/1979 | Middleton | 126/447 |
| 4,182,013 | 1/1980 | Grossman | 29/157.3 C |
| 4,237,971 | 12/1980 | Olsson | 29/157.3 C |
| 4,273,098 | 6/1981 | Silverstein | 126/417 |

Primary Examiner—Daniel J. O'Connor
Attorney, Agent, or Firm—Lackenbach, Siegel, Marzullo, Presta & Aronson

[57] ABSTRACT

In a process for the production of a solar collector panel assembly, a pipe arrangement for carrying a heat exchange fluid and a carrier panel for carrying same and for absorbing solar energy are intimately jointed together as by soldering or brazing. The pipe arrangement has straight pipe sections and curved pipe sections connecting same. A joining agent such as solder is applied to the carrier panel along the lines of the pipe arrangement, and the pipe arrangement is then applied thereto. A filling material comprising a substance which repels the joining agent is disposed in the spaces defined between the pipe runs of the pipe arrangement. The intermediate assembly consisting of carrier panel, joining agent, pipe arrangement, filling material and possibly a heat barrier layer disposed on the side of the assembly remote from the carrier panel is fitted between two pressure plates which are clamped together. Heat applied at least to the side of the assembly at which the carrier panel is disposed causes the joining agent to fuse, thereby securing the pipe arrangement to the carrier panel, with the pipe arrangement being pressed into the bed of joining agent by the pressure applied by the pressure plates.

18 Claims, 2 Drawing Figures

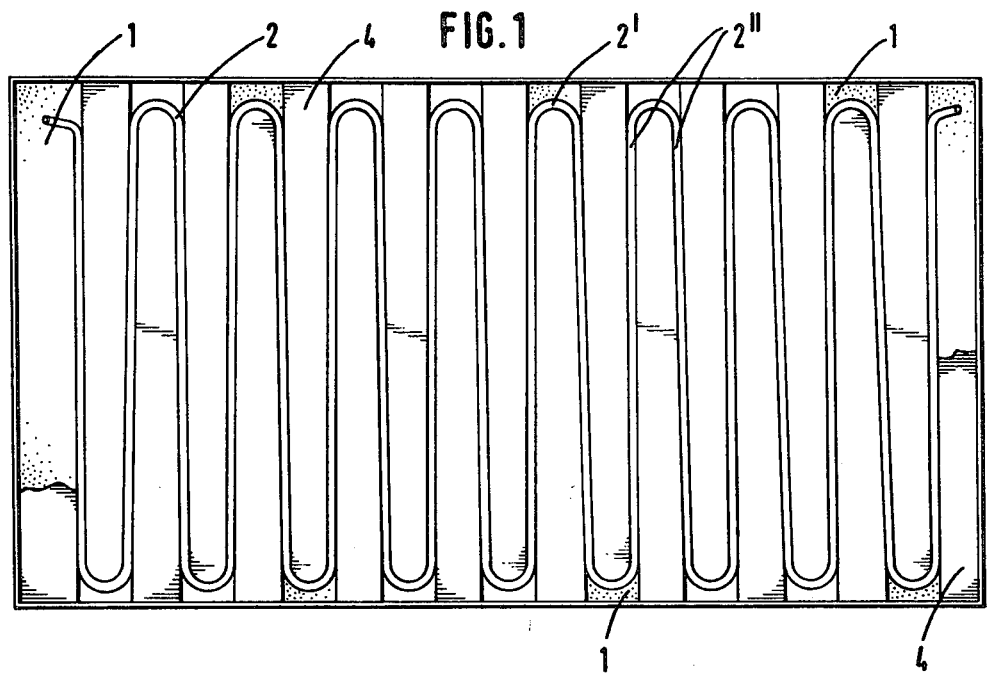
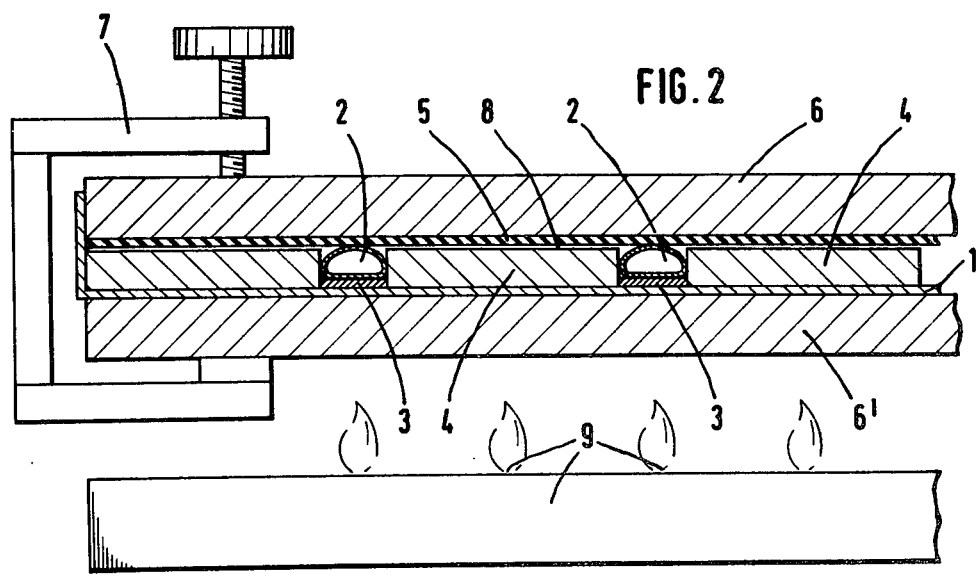

PROCESS FOR THE PRODUCTION OF A SOLAR COLLECTOR PANEL ASSEMBLY AND A PANEL ASSEMBLY PRODUCED THEREBY

BACKGROUND OF THE INVENTION

Panel assemblies for solar collectors frequently comprise a flat carrier panel comprising heat-conductive material, one surface of which receives the solar radiation while disposed at the opposite surface thereof is a pipe arrangement which may be for example of a meander-like or serpentine configuration and through which flows a heat exchange fluid to be heated by the solar radiation impinging on the panel assembly. The carrier panel and the pipe arrangement should be joined together by as intimate a connection as possible in order to maximise the transfer of heat from the carrier panel to the pipe arrangement and thus to the heat exchange fluid flowing therein. On the other hand, an important consideration is that the cost of manufacturing such plate assemblies should be kept as low as possible, for obvious economic reasons.

With regard to the cost aspect, the use of pipe arrangements which are formed from pipes of round cross-section makes it easy to shape the pipe arrangement, using straight pipe sections and curved pipe sections which interconnect the straight sections. However, with pipes of round cross-section, the area of the contact between the pipe and the carrier panel is only small, so that the transfer of heat between the pipe and the carrier panel would be relatively slight, with such a configuration. For that reason, such an arrangement requires a large amount of a joining agent, for example solder or brazing material, to connect the carrier panel and the pipe arrangement together, in order to provide a large heat transfer area at that point. In that respect therefore, the operation of making the connection between the pipe and the carrier panel is not only time-consuming but also requires a large amount of material, all of which increases the costs of production. In addition, that design configuration does not necessarily ensure that gaps between the pipe and the carrier panel are uniformly and cleanly filled with the joining agent used, while in addition, there is no reliable guarantee that, when joining the components together, the carrier panel remains in its flat condition over substantially its entire extent, all those being factors which may count against a satisfactorily large surface area contact for heat transfer from the carrier panel to the pipe arrangement.

In a process for the production of a radiant heating element (see German published specification (DE-AS) No. 16 27 628), the wall portion of the pipe arrangement which is towards the carrier panel is brought into contact with a joining agent such as a bed of solder or brazing, and a filling material is introduced into the spaces defined between the pipe runs of the pipe arrangement. The thickness of the filling material introduced is greater than the diameter of the pipe which is of round cross-section. In the recess in the filling material, which corresponds to the configuration of the pipe arrangement, a cover layer is positioned over the pipe arrangement, in the form of a resilient cushion member which is adapted in respect of its shape to the pipe arrangement and which applies a pressure to the pipe arrangement on the carrier panel when the pipe is disposed in the recess, the intermediate assembly comprising the carrier panel, pipe arrangement, joining agent, filling material and above-mentioned cushion member then being clamped between pressure plates. In that process, both the filling material must have a recess which matches the layout of the pipe arrangement, and the resilient cushion member must also be of a corresponding form, while the cushion member has to be laid with precision into the recess in the filling material, so as to cover over the pipe runs, and that is a time-consuming and costly operation. Further problems are involved in regard to selecting a suitable material which can resist the soldering or brazing temperatures involved, for constituting the cushion member.

German laid-open application (DE-OS) No. 28 06 487 discloses a solar collector which is made up from two sheet metal plates, wherein suitable depressions or recesses are provided in the metal plates, to provide at least one conduit for carrying a heat exchange fluid, which extends in a meander-like configuration. In that assembly, the two plates must be subjected to a deep drawing or other impressing operation and must be precisely aligned relative to each other and disposed accurately one upon the other in order to form the meander conduit.

British patent specification No. 826 625 discloses a plate-type heat exchanger having D-shaped cross-section pipes. In that arrangement, the pipes of D-shaped cross-section have a flattened portion which bears against a carrier panel, while the top side of the pipes and the top side of the carrier panel are covered with a plate which is provided with grooves. The grooves are adapted in respect of their dimensions to the pipes used in that assembly. It will be appreciated that the grooved plate can only be manufactured at relatively high cost, and that has an adverse effect on the total price of a heat exchanger of that kind.

SUMMARY OF THE INVENTION

An object of the present invention is to provide a process for the production of a solar collector panel assembly, which is inexpensive to perform while ensuring satisfactory joins between a carrier panel and pipe means of the assembly.

Yet another object of the present invention is to provide a process for producing a solar collector panel assembly comprising a carrier panel and pipe runs intimately connected thereto, which provides a relatively large area of contact between the carrier panel and the pipe, to ensure good transfer of heat therebetween.

Still another object of the present invention is to provide a process for the production of a solar collector panel assembly which permits the production of such an assembly in a satisfactorily flat or planar form, giving a high level of thermal efficiency.

Another object of the present invention is to provide a process for the production of a solar collector panel assembly comprising a carrier panel and pipe means joined thereto as by soldering or brazing, which does not require individual joining operations to secure the pipe means in position but which enables the pipe means to be so secured in one assembly operation.

Still a further object of the present invention is to provide a solar collector panel assembly, which, while being inexpensive and relatively easy to produce, ensures a high degree of thermal efficiency.

These and other objects are achieved by a process for the production of a solar collector panel assembly which comprises a carrier panel of thermally conductive material, which serves as an absorption surface means for absorbing solar energy impinging thereon, and a continuous pipe arrangement which extends in a meander-like or serpentine configuration and which is joined in intimate contact to the carrier panel. To produce the assembly, the wall of the pipe means which is positioned towards the carrier panel is brought into contact with joining agent such as a soldering or brazing agent on the carrier panel, and a filling material is introduced into the spaces enclosed by the pipe. The filling material is preferably such as to repel the joining agent used so that the latter does not adhere thereto. A cover layer member is applied to the side of the pipe arrangement which is remote from the carrier panel, and the intermediate assembly comprising the carrier panel, pipe, joining agent, filling material and cover layer member is inserted between two flat-surfaced pressure plates which at least substantially completely cover the intermediate assembly. The pressure plates are then clamped together, with heat being applied to the outside of at least the pressure plate which bears against the carrier panel, to cause the joint agent to fuse, thereby to form a firm connection between the pipe and the carrier panel, with the pipe also being pressed into the bed of joining agent on the carrier panel. The thickness of the filling material introduced is so much less than the height of the highest point or apex of the cross-section of the pipe fitted to the carrier panel, above the base surface thereof, before the operation of melting the soldering or brazing agent, that, after the melting operation, the filling material bears at one side against the carrier panel and at the other side against the cover layer member.

The above-defined process in accordance with the present invention provides for inexpensive production of a solar collector, insofar as the carrier panel and the pipe arrangement are connected together, after simple preparatory operations, in a single operating procedure which can be satisfactorily monitored and controlled, which gives a good join between the two components, and which ensures that the whole plate assembly retains its substantially flat or planar condition.

In a preferred feature of the invention, before the pipe is applied to the carrier panel, the side of the pipe which in the assembled condition is towards the carrier panel is provided with a layer or coating to promote the join to be subsequently made; if therefore the joining or connecting material used to connect the pipe to the panel is tin or a tin alloy, the side of the pipe which is towards the carrier panel is subjected to a preliminary tin-plating operation. In this connection, it should be noted here that the term joining agent is used in a broad sense to cover any joining agent which is capable of providing for an intimate connection between the pipe and the carrier panel, giving good heat transfer therebetween, while requiring only a single working operation for that purpose. Preferably, the joining agent is applied to the carrier panel in the form of a strip-like configuration, which corresponds to the required layout of the pipe in the panel assembly.

The pipe arrangement may comprise a plurality of straight pipe runs or sections interconnected by respective curved pipe sections. In that case, the straight pipe sections may extend parallel to each other, but the pipe arrangement may preferably be of such a configuration that, by being suitably arranged on the panel, the straight pipe sections extend in a constantly rising or falling manner, which can promote the flow of heat exchange fluid therethrough in one direction or the other. This arrangement also provides the option that filling material which is introduced into the spaces defined by the straight pipe sections and the curved pipe sections and which serves to determine the positions of the pipe sections relative to each other can be easily removed after the panel assembly has been produced.

The filling material which is used in the above-indicated manner not only determines the positions of the pipe sections relative to each other, but it also prevents an excessively high pressure being aplied to the top side of the pipe, which could then possibly cause deformation thereof, when the join between the pipe arrangement and the carrier panel is being made. As that connection is made by virtue of the application of heat to the assembly, and as the applied heat will act on the joining agent as well as on the surfaces which are to be connected, a heat barrier layer is preferably positioned on the side of the pipe and the filling material which is remote from the carrier panel, to prevent heat from flowing away at that point, although, by virtue of the properties of the material involved, it can also prevent damage to or deformation of the wall of the pipe when pressure is applied to the assembly.

After the intermediate assembly comprising the carrier panel, pipe arrangement, joining agent, filling material and possibly the heat barrier layer have been clamped together between the flat-surfaced pressure plates which preferably entirely cover the intermediate assembly, and heat has then been applied at least to the pressure plate which bears against the carrier panel, thereby to cause the joining agent to fuse and form the intimate connection between the pipe and the carrier panel, the pressure plates, heat barrier layer and filling material can be remmoved with the result that the product is in the form of a completely flat panel assembly with good clean joints between the pipe and the carrier panel.

Preferably, the pipe of the pipe arrangement has a flattened portion on the side thereof which is towards the carrier panel in the assembled condition, in order to provide a connection therewith over a substantial area. For that purpose, it is particularly advantageous to use a pipe of substantially D-shaped cross-section, with the flattened surface portion thereof being connected to the rounded portion which is of a basket handle-like configuration, by way of respective rounded transitional portions, such advantages being in relation not only to good heat transfer due to the substantial area of contact with the carrier panel, but also in regard to the bendability or shapability of the pipe for forming the continuous pipe arrangement.

The material used for the pipe arrangement and the carrier panel is preferably copper or a copper-bearing alloy which has good heat transfer properties, especially as such material can also be satisfactorily joined, at relatively low temperatures, using tin as the joining agent.

In order to produce a clearly defined seam or join between the pipe and the carrier panel and also in order to ensure that the panel assembly retains its planar configuration, the filling material introduced between the runs of the pipe arrangement should preferably be of square or rectangular cross-section. However, it is also possible to use a trapezoidal cross-section, in which case the shorter base line of the trapezium is towards the carrier panel, but with both base lines being parallel to each other. Depending on the width of the panel assembly, the filling material used may be a one-piece panel which is adapted to the desired layout of the straight pipe sections and the curved pipe sections interconnecting same, while, when the panel assembly is of greater width, the one-piece panel referred to above can be replaced by a plurality of mutually matching panel portions, which can facilitate the operations of inserting and removing the filling material.

The height of the filling material is a factor of particular significance, as indicated above. In the initial or starting condition of the panel assembly to be formed by the process of this invention, the gap between the surface of the filling material which is remote from the carrier panel, and the adjoining surface of the heat-barrier layer or the upper pressure plate, must be such that it is preferably about half the thickness of the layer of joining agent applied to the carrier panel to form the join between the carrier panel and the pipe arrangement, when the joining agent and the assembly are in the cold condition, being the condition in which the components have been simply put together and before they are heated to cause the fused connection between the pipe and the carrier panel to be formed. In that case, the heat barrier layer constituting the cover layer or the pressure plate, if no cover layer is used, bears against the apex of the cross-section of the pipe, which is remote from the carrier panel. When pressure and heat are applied, the pipe is then pressed downwardly, that is to say, towards the carrier panel, by a distance which is defined by the abovementioned gap, whereby the pipe is pushed into the molten joining agent.

The filling material is preferably a material which repels the joining agent so that the filling material is not held in place by the joining agent clinging thereto, which could make it difficult to remove the filling material after the assembly has been formed and could cause damage to the join between the carrier panel and the pipe. In a preferred aspect therefore, the joining agent used is tin or a tin alloy while the filling material is aluminium.

It is particularly advantageous for the joining material to be applied to the carrier panel in the form of a strip as that can make it possible to ensure that the joining agent is applied in a uniform thickness, while also giving a simple and inexpensive mode of operation. The joining agent preferably has a melting point of about 280° to 305° C., in which case the temperature required to form the join between the pipe and the carrier panel should be at about 330° C.

The heating effect can be produced by radiant heaters, preferably gas radiant heaters, which are directed on to the outside surface of the pressure plate against which the carrier panel lies. However, in an alternative procedure, the above-defined intermediate assembly, together with the pressure plates clamping same, may also be heated in a furnace.

The pressure plates are preferably made of a metal material, while at least the surfaces thereof which are towards the carrier panel and the pipe as well as the filling material respectively should be flat. In that respect, at least the pressure plate which is against the carrier panel, particularly when the arrangement is heated from only one side, is made from a material which is a good conductor of heat in order to ensure that the heating action rapidly has a substantial effect on the joining agent and the surfaces to be joined thereby.

The pressure plates are desirably urged towards each other in such a way that they retain a substantially flat or planar condition, which depends on the one hand on the thickness thereof and on the other hand on the location at which the clamping forces are applied thereto.

Other objects, features and advantages of the present invention will become apparent from the following description of a preferred embodiment of the invention.

BRIEF DESCRIPTION OF THE DRAWING

FIG. 1 shows a diagrammatic plan view of a solar collector panel assembly with carrier panel, pipe arrangement and filling material thereon, and FIG. 2 shows a view in section perpendicularly through a part of a solar collector panel assembly during manufacture thereof.

DESCRIPTION OF THE PREFERRED EMBODIMENT

Referring therefore now to the drawings and more particularly FIG. 1, in its finished condition, a solar collector panel assembly comprises a carrier panel 1 and a pipe arrangement 2 which is preferably formed from a continuous run of pipe and which extends, as shown, in a meander-like or serpentine configuration. Both the carrier panel 1 and the pipe 2 are preferably made of material which is a good conductor of heat, for example copper or a copper alloy.

The pipe arrangement 2 is preferably formed from a pipe which is of a flattened configuration at one side, as can be seen most clearly from FIG. 2, that is to say, a pipe which is of substantially D-shaped cross-section. The flattened surface portion thereof is at least substantially flat over at least the major part of the extent thereof, and is connected to the curved portion of the pipe cross-section, which in the nature of a basket handle-type curve, by way of respective transitional portions at the sides of the pipe cross-section. As will be appreciated from FIG. 2, the flat surface portion of the pipe cross-section is arranged adjoining the carrier panel 1. The surface of the carrier panel which is remote from the surface adjoining the pipe arrangement 2 may advantageously be blackened, that is to say, the surface for absorbing the solar radiation impinging on the panel assembly.

For the purposes of producing the panel assembly, the pipe arrangement 2 is preferably of such a configuration that each two adjacent pipe sections 2" which are joined together by a curved pipe portion 2' or other shaped member extend in a divergent configuration relative to each other. In that way, when the panel assembly is stood on one of its narrow sides, all the pipe sections 2" extend at a slight angle of inclination relative to the horizontal, which can have an advantageous effect on the flow of heat exchange fluid through the pipe.

Before the pipe arrangement 2 is applied to the carrier panel 1, a joining agent 3 comprising for example a soldering or brazing material such as tin or a tin alloy is applied to the carrier panel 1 in a pattern corresponding to the layout of the pipe arrangement 2. The joining agent 3 is thus preferably applied to the carrier panel 1 in the form of a strip, as that makes it possible to determine the thickness of the layer of joining agent applied, with a relatively high degree of accuracy. It is advantageous for the connecting surface of the pipe to be tinplated before being applied to the carrier panel or bed of joining agent thereon.

After the pipe arrangement 2 has been applied to the carrier panel 1 in the above-indicated manner, a filling material 4 is introduced into the spaces defined by the straight pipe sections 2" and the pipe sections 2'. In the embodiment illustrated, the filling material 4 is in the form of a one-piece plate, but, depending on the width of the panel assembly, it is also possible to use plate portions which match and fit together in the assembled position on the carrier panel.

The filling material 4 should be such that it repels the joining agent and does not therefore form a connection therewith, being therefore for example aluminium if the joining agent 3 is a tin alloy. The melting point of the joining agent is preferably 280° to 305° C., while the join between the carrier panel and the pipe arrangement is made at about 330° C.

In the processs for producing the panel assembly, a layer 5 of heat-barrier material, for example asbestos, is laid on the surfaces of the filling material 4 and the pipe arrangement 2 which are remote from the carrier panel 1. However, that layer may also be secured as by adhesive means to the upper pressure plate which will be described in greater detail hereinafter. It should be noted here that in general an individual layer 5 is of greater advantage, just from the point of view of renewal thereof, as required. This layer 5 should also be non-deformable, so that asbestos or a material having comparable properties to asbestos is preferably employed.

The intermediate assembly comprising the carrier panel 1, the pipe arrangement 2, the joining agent 3, the filling material 4 and the cover layer 5 is then disposed between two pressure plates 6 and 6' of metal material. At least the inward surfaces of the pressure plates 6 and 6', which are therefore towards the carrier panel, and the filling material and pipe arrangement, should be as flat or planar as reasonably possible. The pressure plates 6 and 6' cover the intermediate assembly over at least a substantial part and preferably the whole of the extent thereof. Preferably, at least the pressure plate 6' which is towards the carrier panel 1 comprises a material which is a good conductor of heat. The pressure plates are then clamped together, with the intermediate assembly disposed therebetween. For the purposes of clamping the pressure plates together, any suitable clamping means can be used, being illustrated in the form of screw clamps 7. In order to produce a uniform pressure which acts over the entire extent of the panel assembly, the pressure panels should be of suitable thickness, in dependence on the points of engagement thereon of the screw clamps 7. In other words, the thickness of the pressure plates, in conjunction with the number and locations of the screw clamps 7, should be so selected as to ensure that the pressure plates remain in a substantially planar condition when clamped. When dealing with panel assemblies of substantial areas, it is possible to use clamping frame arrangements having a plurality of shaped bar members which for example intersect at right angles and which extend across the surfaces of the pressure plates, to provide stiffening and reinforcement thereof.

In the condition shown in FIG. 2 wherein there is a gap 8 of about half the thickness of the layer or bed 3 of joining agent, between the filling material 4 and the heat-barrier layer 5, heat is applied at least to the outside surface of the pressure plate 6' which is adjacent the carrier panel 1. For that purpose, the heating means may be for example gas radiant heaters, or alternatively the assembly shown in FIG. 2 is introduced into an oven or furnace, for example an electric furnace, so that the joining agent 3 is caused to melt and the carrier panel and the pipe arrangement 2 are heated in such a way that the joining agent then forms the intimate connection required therebetween.

The screw clamps 7 or other clamping means generally have an inherent clamping action which is sufficient to close the gap 8, and thus cause the pipe arrangement 2 to be pressed into the bed of joining agent 3. If the filling material 4 is of precisely right-angled cross-section, for which purpose plates are preferably used, the joining agent 3 cannot flow away sideways but at best can rise up somewhat around the pipe arrangement 2 in order thereby to fill up the wedge-shaped spaces between the joining agent, which is in a strip-like form in the initial condition, the wall surface of the pipe 2 and the adjoining surface of the filling material 4. If the filling material is of a trapezoidal cross-section, the joint configuration formed by the joining agent can be somewhat larger, which may be desirable in certain cases, although requiring a larger amount of joining agent.

After the heating means has been switched off or the assembly removed from the furnace and after a certain period of time has elapsed in order to allow the join between the pipe arrangement 2 and the carrier panel 1 to set, the pressure plates 6 and 6' and the heat-barrier layer 5 are removed. The filling material 4 is then taken out of the spaces between the pipe sections 2", which is facilitated by the increase in width towards the side remote from the respective curved pipe portion 2'.

The resulting product is then a solar collector panel assembly having a carrier panel which is at least substantially planar to serve as a solar energy absorption surface, and a pipe arrangement which is applied in intimate contact thereto, comprising straight pipe sections and intermediate members or curved portions connecting same, with two respectively adjacent pipe sections extending in a divergent configuration. That pipe arrangement which preferably comprises a pipe of D-shaped cross-section is intimately joined to the carrier panel by the joining agent over the entire flattened surface portion of the pipe, the arrangement and the configuration of the filling material forming a good cleanly delimited join without pieces of joining material running out sideways, with the joining material possibly also filling up the wedge-shaped spaces defined by the rounded configuration of the pipe, as indicated above, thereby ensuring the provision of a substantial area of contact between the pipe arrangement and the carrier panel to give good heat transfer therebetween.

Various modifications and alterations may be made in the abovedescribed structure without thereby departing from the spirit and scope of the invention.

What is claimed is:

1. In a process for the production of a solar collector panel assembly comprising a carrier panel of heat-conductive material, to serve as solar energy absorption surface means, and a pipe arrangement of meander-like configuration which is mounted on the carrier panel in intimate contact therewith, wherein the pipe arrangement is applied to the carrier panel such that the wall portion of the pipe arrangement which in the assembled condition of the panel assembly is towards the carrier panel is brought into contact with a joining agent on the carrier panel, a filling material is introduced into the spaces defined on the carrier panel by the pipe arrangement, the intermediate assembly formed by the carrier panel, the pipe arrangement, the joining agent, and the filling material is disposed between first and second pressure plates with flat surfaces to cover the intermediate assembly, the pressure plates are urged towards each other, and heat is applied at least to the pressure plate which bears against the carrier panel, to cause the joining agent to melt thereby to form the join between the pipe arrangemment and the carrier panel, the improvement that said filling material is introduced in a thickness which is so much smaller than the height of the highest point of the cross-section of the pipe arrangement on the carrier panel above the base surface thereof that, after the joining agent has melted, said filling material bears on one side against the carrier panel and on the other side against the adjacent surface of said adjacent pressure plate.

2. A process as set forth in claim 1 wherein before said pressure plates are applied, a cover layer is disposed on the side of said intermediate assembly which is remote from said carrier panel, said filling material bearing against said cover layer in the finished condition of said assembly between said pressure plates.

3. A process as set forth in claim 2 wherein said cover layer is a heat-barrier cover layer which covers the pipe arrangement and the filling material over at least substantially the entire area thereof.

4. A process as set forth in claim 1 wherein said filling material is introduced only as far as a level which is below the level of the apex of the pipe arrangement cross-section at the side thereof remote from the carrier panel.

5. A process as set forth in claim 1 wherein a gap is defined between said highest point of said pipe arrangement and the surface of the filling material adjacent thereto, which substantially corresponds to half the thickness of the layer of joining agent on the carrier panel before heat has an effect thereon.

6. A process as set forth in claim 1 wherein said filling material comprises a plate of filling material.

7. A process as set forth in claim 1 wherein said filling material comprises a plurality of plate portions which are fitted together in the said intermediate assembly.

8. A process as set forth in claim 1 wherein the pipe means forming said pipe arrangement, before being applied to the carrier panel, is provided with a layer adapted to promote the formation of the join between same and the carrier panel.

9. A process as set forth in claim 1 wherein the pipe means forming said pipe arrangement are provided with a flattened portion at the side thereof which in the assembled condition is towards the carrier panel.

10. A process as set forth in claim 1 wherein said pipe arrangement and said carrier panel are made of copper.

11. A process as set forth in claim 1 wherein said pipe arrangement and said carrier panel are made of copper alloy.

12. A process as set forth in claim 1 wherein said filling material is a portion of trapezoidal cross-section, the smaller base thereof being towards the carrier panel.

13. A process as set forth in claim 1 wherein said joining agent is a tin material and said filling material is aluminium.

14. A process as set forth in claim 1 wherein said joining agent has a melting point in the range of from 280° to 320° C.

15. A process as set forth in claim 1 wherein the join between the pipe arrangement and the carrier panel is produced at a temperature of about 330° C.

16. A process as set forth in claim 1 wherein said heat is produced by radiant heater means directed on to the outside surface of said pressure plate which is adjacent the carrier panel.

17. A process as set forth in claim 1 wherein said intermediate assembly with the pressure plates clamping same together is heated in a furnace.

18. A process as set forth in claim 1 wherein said pressure plates comprise a metal material and at least the pressure plate directly adjacent said carrier panel is made of material having a high degree of thermal conductivity.

* * * * *